(12) United States Patent
Lee et al.

(10) Patent No.: US 8,780,454 B2
(45) Date of Patent: Jul. 15, 2014

(54) WIDE ANGLE LENS SYSTEM AND PHOTOGRAPHING APPARATUS

(75) Inventors: Yong-jae Lee, Incheon (KR); Young-woo Park, Changwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 710 days.

(21) Appl. No.: 13/089,518

(22) Filed: Apr. 19, 2011

(65) Prior Publication Data

US 2012/0056976 A1 Mar. 8, 2012

(30) Foreign Application Priority Data

Sep. 7, 2010 (KR) .................. 10-2010-0087662

(51) Int. Cl.
*G02B 15/14* (2006.01)
*G02B 3/02* (2006.01)
*G02B 15/177* (2006.01)

(52) U.S. Cl.
CPC .................................. *G02B 15/177* (2013.01)
USPC ........................ 359/691; 359/683; 359/713

(58) Field of Classification Search
USPC .................................. 359/683, 684, 691, 713
See application file for complete search history.

(56) References Cited

FOREIGN PATENT DOCUMENTS

| JP | 2007-225963 A | 9/2007 |
|---|---|---|
| JP | 2008-191230 A | 8/2008 |
| JP | 2009-186791 A | 8/2009 |
| JP | 2010-061033 A | 3/2010 |

*Primary Examiner* — Jack Dinh
(74) *Attorney, Agent, or Firm* — Drinker Biddle & Reath LLP

(57) ABSTRACT

A wide angle lens system includes a first lens group having a negative refractive power and a second lens group having a positive refractive power arranged from an object side. The first lens group includes a first lens of a meniscus shape having a convex surface toward the object side, a second lens having a concave surface toward the object side, and a third lens having a convex surface toward the object side, and the second lens group includes a fourth lens having a convex surface toward the object side, a fifth lens having a concave surface toward the object side, and a sixth lens of a meniscus shape having a concave surface toward the object side. A photographing apparatus includes the wide angle lens system.

19 Claims, 12 Drawing Sheets

WIDE ANGLE LENS SYSTEM AND PHOTOGRAPHING APPARATUS

CROSS-REFERENCE TO RELATED PATENT APPLICATION

This application claims the priority benefit of Korean Patent Application No. 10-2010-0087662, filed on Sep. 7, 2010, in the Korean Intellectual Property Office, the disclosure of which is incorporated herein in its entirety by reference.

BACKGROUND

1. Field of the Invention

Embodiments relate to a wide angle lens system and a photographing apparatus including the same.

2. Description of the Related Art

Recently, the use of digital cameras and video cameras including a solid state pickup device such as a charge coupled device (CCD) or a complementary metal-oxide semiconductor (CMOS) has considerably increased. In particular, camera modules offering megapixels are often required in many applications, and common digital cameras of 5 megapixels or more having high image quality have been distributed. Digital cameras including a CCD or a CMOS or cameras for use in mobile phones should be manufactured with low costs and have small sizes and low weights.

In addition, as demands for such cameras increase, demands for shot lenses such as telephoto lenses or wide angle lenses also increase. A suggested wide angle lens is a retro-focus type (inverted telephoto type) lens structure including a first lens group having a long back focal length and having a negative refractive power from an object side and a second lens group having a positive refractive power. However, the retro-focus type lens performs a focusing operation by using the second lens group, and in this case, a height of an extra-axial beam incident within the lens system changes significantly, and aberrations increase. Thus, a way of compensating for the variation of aberrations during the focusing operation is desired in the retro-focus type lens.

SUMMARY

Embodiments include a wide angle lens system having an appropriate back focal length and an improved aberration correcting efficiency, and a photographing apparatus including the wide angle lens system.

According to an embodiment, a wide angle lens system includes: a first lens group having a negative refractive power and a second lens group having a positive refractive power arranged from an object side, wherein the first lens group includes a first lens of a meniscus shape having a convex surface toward the object side, a second lens having a concave surface toward the object side, and a third lens having a convex surface toward the object side, and the second lens group includes a fourth lens having a convex surface toward the object side, a fifth lens having a concave surface toward the object side, and a sixth lens of a meniscus shape having a concave surface toward the object side, and the wide angle lens system satisfies the following expression, $$0.60 \le f_{all}/D_{all} \le 1.00,$$

where $f_{all}$ denotes an effective focal length of the wide angle lens system, and $D_{all}$ denotes a distance from a vertex of the surface of the first lens facing the object side to a vertex of a surface of the sixth lens facing an image side.

The wide angle lens system may further satisfy the following expressions, $$-0.10 \le d1/f1 \le -0.03$$

$$0.03 \le d2/f2 \le 0.10,$$

where d1 denotes a distance between the first lens and the second lens, f1 denotes an effective focal length of the first lens group, d2 denotes a distance between the fifth lens and the sixth lens, and f2 denotes an effective focal length of the second lens group.

The wide angle lens system may further satisfy the following expression, $$0.25 \le d12/f_{all} \le 0.35,$$

where d12 denotes a distance between the first lens group and the second lens group, and $f_{all}$ denotes an effective focal length of the wide angle lens system.

The wide angle lens system may further satisfy the following expressions, $$-2.0 \le (R_{1B}-R_{2A})/(R_{1B}+R_{2A}) \le -1.5$$

$$-5.0 \le (R_{3B}-R_{4A})/(R_{3B}+R_{4A}) \le 4.0$$

$$0.5 \le (R_{5B}-R_{6A})/(R_{5B}+R_{6A}) \le 0.8,$$

where $R_{1B}$ denotes a radius of curvature of an image side surface of the first lens, $R_{2A}$ denotes a radius of curvature of the object side surface of the second lens, $R_{3B}$ denotes a radius of curvature of an image side surface of the third lens, $R_{4A}$ denotes a radius of curvature of the object side surface of the fourth lens, $R_{5B}$ denotes a radius of curvature of an image side surface in the fifth lens, and $R_{6A}$ denotes a radius of curvature of the object side surface of the sixth lens.

The wide angle lens system may further satisfy the following expressions, $$-4.5 \le f1/f_{all} \le -2.7$$

$$0.8 \le f2/f_{all} \le 1.1,$$

where f1 denotes an effective focal length of the first lens group, f2 denotes an effective focal length of the second lens group, and $f_{all}$ denotes an effective focal length of the wide angle lens system.

The wide angle lens system may further satisfy the following expression, $$3.0 \le D_{all}/HT \le 3.3,$$

where $D_{all}$ denotes the distance from the vertex of the object side surface of the first lens to the vertex of the image side surface of the sixth lens, and HT denotes an image plane height of a paraxial marginal ray.

The sixth lens may have at least one aspherical surface.

The first lens or the sixth lens may have the largest effective aperture among the lenses in the wide angle lens system.

The second lens and the third lens may be cemented.

The fourth lens and the fifth lens may be cemented.

The wide angle lens system may further include a stop between the first lens group and the second lens group.

The second lens may be a biconcave lens, and the fifth lens may be a biconcave lens.

The third lens may be a biconvex lens, and the fourth lens may be a biconvex lens.

The first lens may have a negative refractive power.

The sixth lens may have a positive refractive power.

The first lens group and the second lens group may move together to perform a focusing operation.

According to another embodiment, a photographing apparatus includes: a wide angle lens system; and an imaging sensor that receives light focused by the wide angle lens system, wherein the wide angle lens system includes a first lens group having a negative refractive power and a second lens group having a positive refractive power arranged from an object side, the first lens group includes a first lens of a meniscus shape having a convex surface toward the object side, a second lens having a concave surface toward the object side, and a third lens having a convex surface toward the object side, and the second lens group includes a fourth lens having a convex surface toward the object side, a fifth lens having a concave surface toward the object side, and a sixth lens of a meniscus shape having a concave surface toward the object side, and the wide angle lens system satisfies the following expression, $$0.60 \leq f_{all}/D_{all} \leq 1.00,$$

where $f_{all}$ denotes an effective focal length of the wide angle lens system, and $D_{all}$ denotes a distance from a vertex of the surface of the first lens facing the object side to a vertex of a surface of the sixth lens facing an image side.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
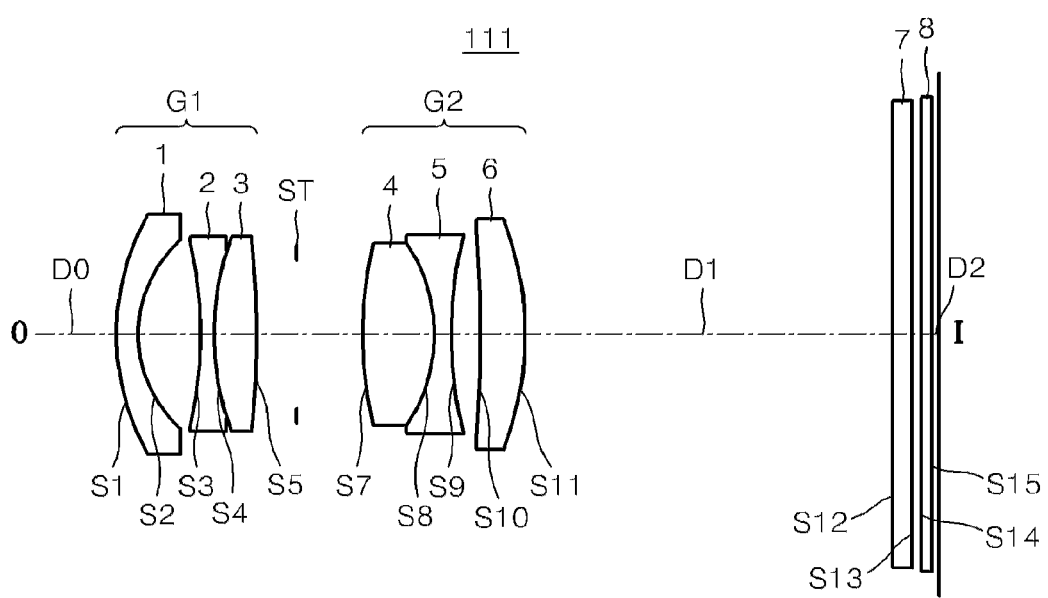
FIG. 1 is a diagram showing a wide angle lens system, according to an embodiment.

Exemplary embodiments will now be described more fully with reference to the accompanying drawings, in which the exemplary embodiments are shown. In the drawings, the thicknesses of layers and regions are exaggerated for clarity. Like reference numerals in the drawings denote like elements, and thus their repetitive description will be omitted.

FIG. 1 is a diagram showing a wide angle lens system, according to an embodiment. Referring to FIG. 1, a wide angle lens system 111 according to an embodiment includes a first lens group G1 and a second lens group G2 arranged in this order from a side of an object O to a side of an image I.

The first lens group G1 may have a negative refractive power, and the second lens group G2 may have a positive refractive power. The first lens group G1 may include a first lens 1 having a meniscus shape, a second lens 2 having a concave surface toward the object O side, and a third lens 3 having a convex surface toward the object O side. The second lens group G2 may have a fourth lens 4 having a convex surface toward the object O side, a fifth lens 5 having a concave surface toward the object O side, and a sixth lens 6 having a meniscus shape.

Since the third lens 3 has a convex surface facing the image I side and the fourth lens 4 has a convex surface facing the object O side, an angle at which a beam is incident on the surface of the fourth lens 4 facing the object O side is increased and thereby increasing large refractive power. In this case, it is advantageous to minimize an image height of the proceeding beam to reduce an overall length of the lens system. When a lens located next to a stop ST has a concave surface facing the object O side, it is easy to control aberrations; however, it is difficult to reduce the size of the lens system because a necessary refractive power may not be obtained. Therefore, the fourth lens 4 located next to the stop ST may have a convex surface facing the object O side for reducing the size of the lens system.

The stop ST may be disposed between the first lens group G1 and the second lens group G2. The first lens group G1 and the second lens group G2 may include lenses having symmetric shapes. Here, the symmetric shape does not denote the same shapes, but may denote symmetry in lens types, that is, concave, convex, and meniscus types. For example, the first lens 1 may have a meniscus shape having a convex surface toward the object side O, and the sixth lens 6 may have a meniscus shape having a concave surface toward the object side O. The first lens 1 may have a negative refractive power, and the sixth lens 6 may have a positive refractive power. In addition, the second lens 2 may be a biconcave lens, and the fifth lens 5 may be also a biconcave lens. Also, the third lens 3 may be a biconvex lens, and the fourth lens 4 may be a biconvex lens.

As described above, when the lenses are symmetrically arranged based on the stop ST, it may be easy to control aberrations. On the other hand, the lenses of the first and second lens groups G1 and G2 close to the stop ST may be doublet lenses. For example, the second and third lenses 2 and 3 may be doublet lenses. The fourth and fifth lenses 4 and 5 may be doublet lenses. The sixth lens 6 may have at least one aspherical surface. For example, the sixth lens 6 may have an aspherical surface facing the image side I. In the wide angle lens system, the first and second lens groups G1 and G2 may move together during focusing.

In order to inexpensively and compactly configure the wide angle lens system and have excellent optical performances, the number of lenses in the lens system may be reduced. In addition, it is desirable to minimize the overall length and the size in a radial direction of the lens system. In order to minimize the overall length of the lens system, thicknesses of the lenses and distances between the lenses may be reduced. In order to minimize the distances between the lenses, the second and third lenses 2 and 3 may be cemented, and the fourth and fifth lenses 4 and 5 may be cemented. In addition, the overall length of the lens system may be minimized by reducing the distance between the first and second lenses 1 and 2 and the distance between the fifth and sixth lenses 5 and 6, and the distance between the first and second lens groups G1 and G2.

In addition, in order to reduce fabrication costs of the wide angle lens system 111 of the present embodiment, the number of lenses therein may be reduced, and usage of aspherical lenses may be reduced. In order to use aspherical lenses effectively, aberrations should be controlled appropriately and the number of aspherical lenses should be reduced. In the present embodiment, at least a surface of the sixth lens 6, for example, the surface of the sixth lens 6 facing the image side I, is an aspherical surface, and thus, coma and distortion aberrations may be controlled. Otherwise, at least one of the lens surface of the third lens 3 next to the stop ST and the lens surface of the fourth lens 4 next to the stop ST may be an aspherical surface.

On the other hand, the first lens group G1 and the second lens group G2 are moved to perform focusing in order to reduce load in electronic control elements such as automatic focusing (AF). Thus, optical performance degradation caused by a change in an off-axial beam that is generated when performing a focusing operation using only the second lens group G2 may be reduced.

On the other hand, the wide angle lens system 111 according to the present embodiment may satisfy the following expression.

$$0.60 \le f_{all}/D_{all} \le 1.00 \qquad (1)$$

where $f_{all}$ denotes a valid focal distance of the wide angle lens system 111, and $D_{all}$ denotes a distance from a vertex of the object O side surface of the first lens 1 to a vertex of the image I side surface of the sixth lens 6.

The expression 1 above denotes a ratio between the effective focal length and the overall length of the wide angle lens system 111, and denotes that the wide angle lens system 111 has a compact structure. In expression 1, when the value of $f_{all}/D_{all}$ is less than the lower limit, the lens system becomes larger. When the value of $f_{all}/D_{all}$ is greater than the upper limit, the lens system may be minimized; however, it is difficult to control coma and astigmatism.

Next, the wide angle lens system 111 of the present embodiment may satisfy the following expressions.

$$-0.10 \le d1/f1 \le -0.03 \qquad (2)$$

$$0.03 \le d2/f2 \le 0.10 \qquad (3)$$

where d1 denotes a distance between the first lens 1 and the second lens 2, f1 denotes an effective focal length of the first lens group G1, d2 denotes a distance between the fifth lens 5 and the sixth lens 6, and f2 denotes an effective focal length of the second lens group G2. In expression 2, when the value of d1/f1 is greater than the corresponding upper limit, an overall length of the first lens group G1 may be reduced; however, it is difficult to correct coma and distortion. In addition, when the value of d1/f1 is less than the lower limit, it is difficult to control the overall length of the wide angle lens system 111 and to control aberrations. In expression 3, when the value of d2/f2 is less than the lower limit, astigmatism and distortion become worse, and when the value of d2/f2 is greater than the upper limit, it is difficult to control the overall length of the wide angle lens system and distortion may increase.

The wide angle lens system 111 of the present embodiment may satisfy the following expression.

$$0.25 \le d12/f_{all} \le 0.35 \qquad (4)$$

where d12 denotes a distance between the first lens group G1 and the second lens group G2, and $f_{all}$ denotes the effective focal length of the wide angle lens system 111. When the value of $d12/f_{all}$ greater than the upper limit, it is easy to control aberrations while the overall length of the entire lens system increases, and when the value of $d12/f_{all}$ is less than the lower limit, the overall length of the entire lens system is reduced while aberrations such as distortion may be generated.

The wide angle lens system according to the present embodiment may satisfy the following expressions.

$$-2.0 \le (R_{1B}-R_{2A})/(R_{1B}+R_{2A}) \le -1.5 \qquad (5)$$

$$-5.0 \le (R_{3B}-R_{4A})/(R_{3B}+R_{4A}) \le 4.0 \qquad (6)$$

$$0.5 \le (R_{5B}-R_{6A})/(R_{5B}+R_{6A}) \le 0.8 \qquad (7)$$

where $R_{1B}$ denotes a radius of curvature of the image side I surface of the first lens 1, $R_{2A}$ denotes a radius of curvature of the object side O surface of the second lens 2, $R_{3B}$ denotes a radius of curvature of the image side I surface of the third lens 3, $R_{4A}$ denotes a radius of curvature of the object side O surface of the fourth lens 4, $R_{5B}$ denotes a radius of curvature of the image side I surface of the fifth lens 5, and $R_{6A}$ denotes a radius of curvature of the object side O surface of the sixth lens 6. Expressions 5 through 7 define formation characteristics of the wide angle lens system. Expression 5 may control shapes of the image side I surface of the first lens 1 and the object side O surface of the second lens 2 in order to control astigmatism and distortion. In expression 5, when a value of $(R_{1B}-R_{2A})/(R_{1B}+R_{2A})$ exceeds the upper or lower limit, distortion increases and astigmatism is generated, and thus, it is difficult to control aberrations. Expression 6 controls shapes of the image I side surface of the third lens 3 and the object O side surface of the fourth lens 4 so that the symmetry based on the stop ST may be maintained.

Based on the stop ST, the image I side surface of the third lens 3 may be concave toward the object O side, and the object O side surface of the fourth lens 4 may be convex toward the object O side. Due to the symmetric structure, the distance between the first lens group G1 and the second lens group G2 may be reduced. When the value of $(R_{3B}-R_{4A})/(R_{3B}+R_{4A})$ exceeds the upper or lower limit, distortion may increase, and spherical aberration and astigmatism may increase. In expression 7, the image I side surface of the fifth lens 5 and the object O side surface of the sixth lens 6 are controlled, and thus, astigmatism and increase of distortion may be controlled. When the value of $(R_{5B}-R_{6A})/(R_{5B}+R_{6A})$ exceeds the upper or lower limit, astigmatism and distortion may increase.

The wide angle lens system according to the present embodiment may satisfy the following expressions.

$$-4.5 \le f1/f_{all} \le 2.7 \qquad (8)$$

$$0.8 \le f2/f_{all} \le 1.1 \qquad (9)$$

where f1 denotes the effective focal length of the first lens group G1, f2 denotes the effective focal length of the second lens group G2, and $f_{all}$ denotes the effective focal length of the wide angle lens system 111.

Expressions 8 and 9 are about distribution of refractive power. Effective focal lengths and appropriate back focal lengths may be ensured by distributing refractive power appropriately, and the lens shapes for processing and controlling aberrations easily may be maintained by distributing refractive power appropriately. Expression 8 is about the effective focal length of the first lens group G1, and when the value of $f1/f_{all}$ satisfies the range of expression 8, an appropriate back focal length and the overall length of the first lens group G1 may be maintained, and aberrations such as spherical aberration and coma may be controlled. Expression 9 is about the effective focal length of the second lens group G2, and when the value of f2/f$_{all}$ satisfies the range of expression 9, an appropriate refractive power may be ensured and the refractive power may be restrained so as to ensure the overall length of the lens system and control aberrations easily.

The wide angle lens system of the present embodiment may satisfy the following expression.

$$3.0 \leq D_{all}/HT \leq 3.3 \quad (10)$$

where D$_{all}$ denotes the distance between the vertex of the object side O surface of the first lens 1 and the vertex of the image side I surface of the sixth lens 6, and HT denotes an image plane height of a paraxial marginal ray. Expression 10 denotes a ratio between the overall length of the wide angle lens system 111 and a valid image plane height, that is, a size of an imaging device.

On the other hand, in the wide angle lens system 111 of the present embodiment, the first lens 1 or the sixth lens 6 may have the largest valid aperture among the lenses. As described above, the lens having the largest size is limited in the lens system having symmetry, and thus, the increase of the entire lens system due to the asymmetric increase of one of the image and object sides may be prevented.

Next, an aspherical surface of a lens in the present embodiment may be defined as follows.

The aspherical shape may be represented by the following equation, when an optical axis direction is assumed to be an X-axis, a direction perpendicular to the optical axis direction is assumed to be a Y-axis, and a proceeding direction of a light beam is a positive direction. Here, x denotes a distance along the optical axis direction from a vertex of the lens, y denotes a distance in the direction perpendicular to the optical axis, K denotes a conic constant, A, B, C, and D denote deformation terms, and c denotes an inverse number of a radius of curvature (1/R) at the vertex of the lens.

$$x = \frac{cy^2}{1 + \sqrt{1-(K+1)c^2y^2}} + Ay^4 + By^6 + Cy^8 + Dy^{10} \quad (11)$$

Next, data of the wide angle lens system 111 according to the embodiments will be described as follows. Hereinafter, EFL denotes an effective focal length (mm) of the wide angle lens system, Fno denotes an F number, FOV denotes a half-viewing angle (degree), R denotes a radius of curvature (mm), D denotes a central thickness of a lens or a distance (mm) between neighboring lenses, Nd denotes a refractive index, vd denotes an Abbe number, and ST denotes a stop.

First Embodiment

FIG. 1 shows the wide angle lens system according to a first embodiment, in which reference numerals 7 and 8 denote filters. The following tables represent design data of the wide angle lens system according to the first embodiment.

EFL=20.2634/Fno=2.8563/FOV=37.5393

TABLE 1

| Lens surface | R | D | Nd | Vd |
|---|---|---|---|---|
| OBJECT | INFINITY | D0 | | |
| S1 | 14.28 | 1.3 | 1.7433 | 49.2 |
| S2 | 7.819 | 3.82 | | |
| S3 | −22.5 | 0.8 | 1.51823 | 59 |
| S4 | 16.2 | 2.67 | 1.883 | 40.8 |
| S5 | −49.03 | 2.39 | | |
| STOP | INFINITY | 4.05 | | |
| S7 | 24.1 | 4.4 | 1.8042 | 46.5 |
| S8 | −9.6 | 1 | 1.69895 | 30.1 |
| S9 | 25.17 | 1.74 | | |
| S10 | −105 | 2.74 | 1.68997 | 53 |
| S11 | −16.4 | D1 | | |
| S12 | INFINITY | 1.12 | 1.5168 | 64.2 |
| S13 | INFINITY | 0.5 | | |
| S14 | INFINITY | 0.7 | 1.5168 | 64.2 |
| S15 | INFINITY | D2 | | |
| IMAGE | INFINITY | | | |

Following table 2 represents the deformation terms in the first embodiment.

TABLE 2

| Lens surface | K | A | B | C | D |
|---|---|---|---|---|---|
| S11 | −1 | 3.28982E−05 | 9.45759E−08 | 5.80525E−09 | 0.00000E+00 |

Following table 3 represents variable distances during focusing in the wide angle lens system according to the first embodiment.

TABLE 3

| D0 | INFINITY | 1219.62 | 115.583 |
|---|---|---|---|
| D1 | 22.539 | 22.876 | 26.186 |
| D2 | 0.46 | 0.46 | 0.46 |

Figure 2:
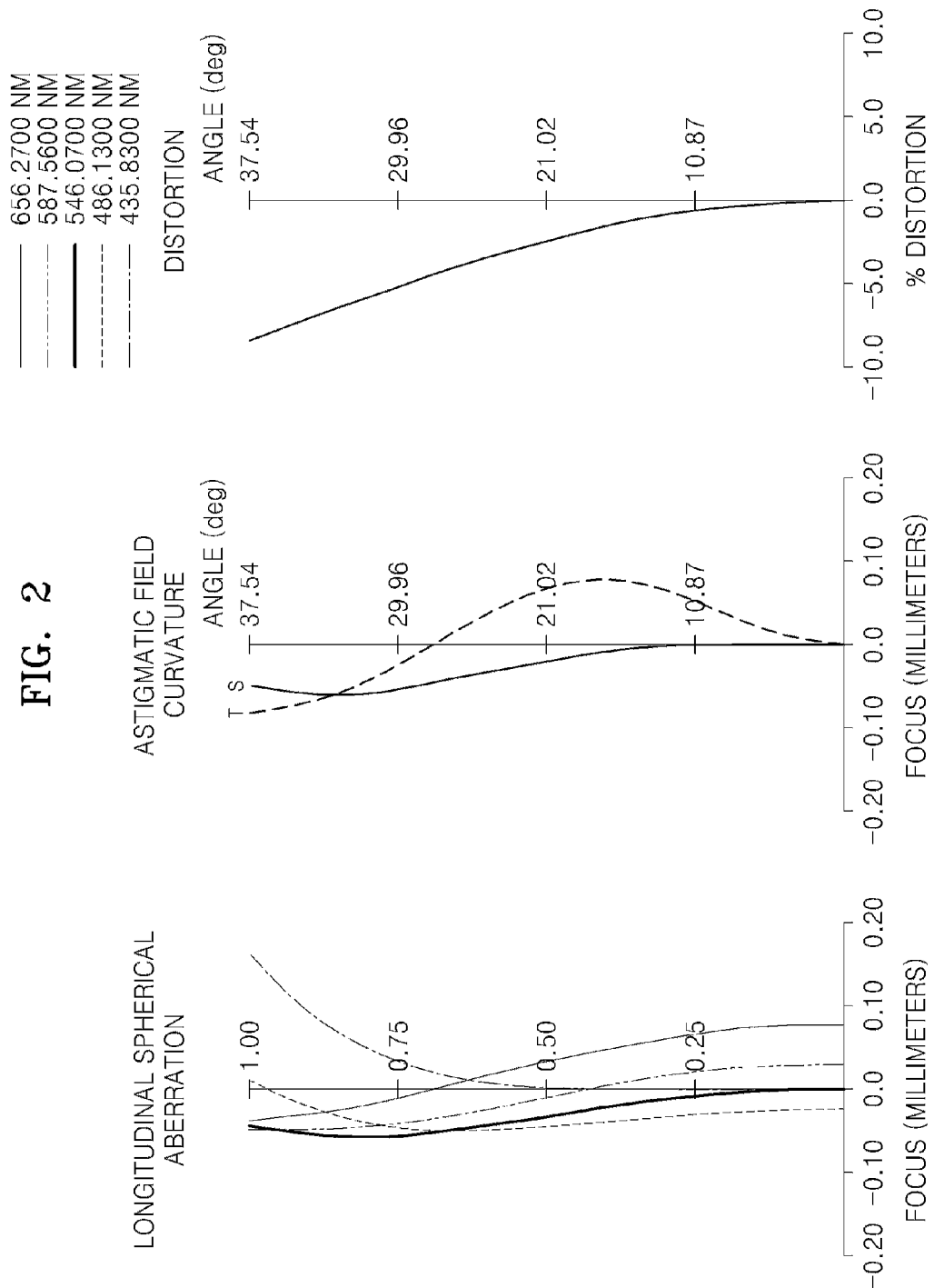
FIG. 2 is a diagram showing longitudinal spherical aberration, astigmatic field curvature, and distortion of the wide angle lens system shown in FIG. 1.
Figure 3:
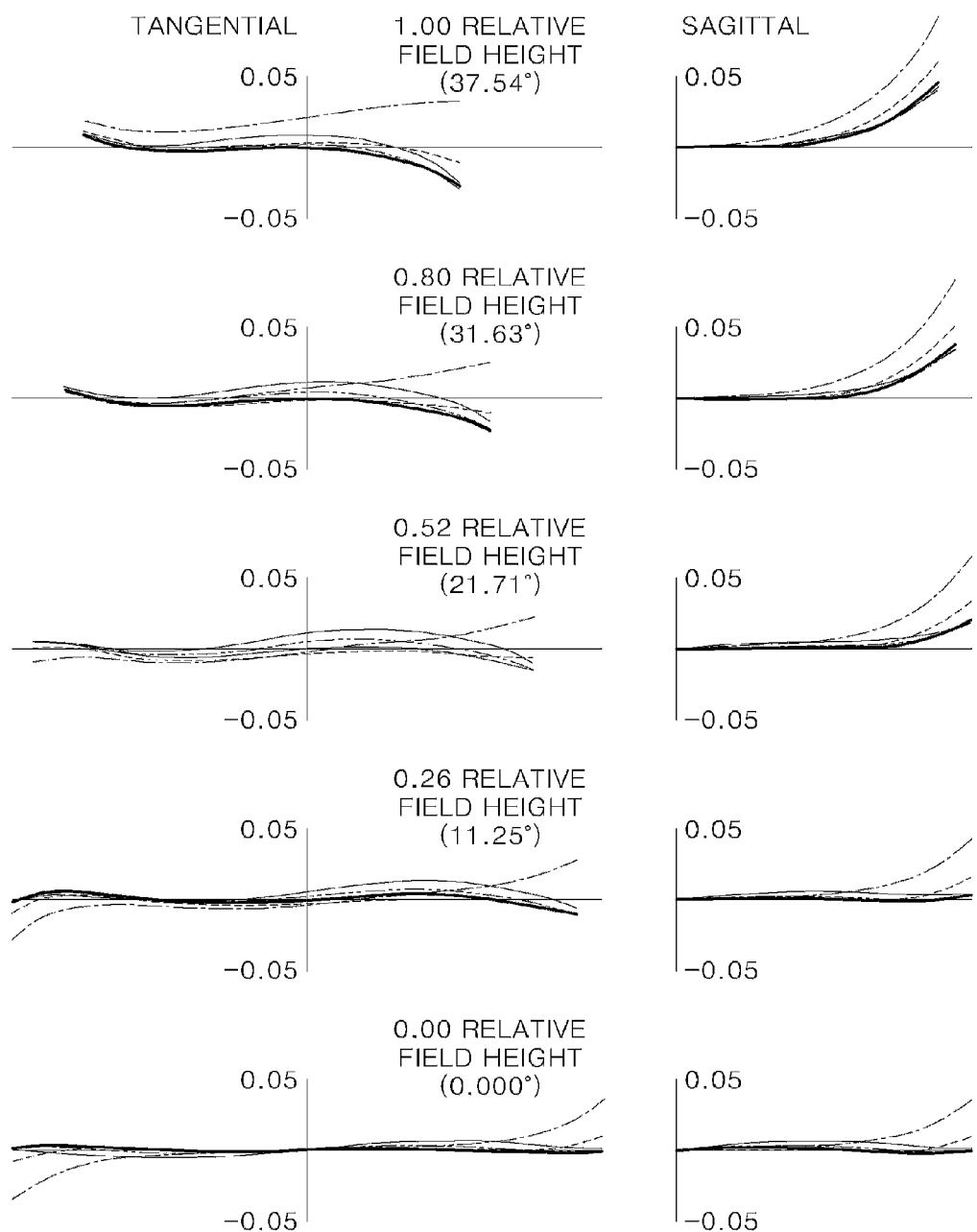
FIG. 3 is a diagram showing lateral aberration degrees of the wide angle lens system of FIG. 1.

FIG. 2 is a diagram showing longitudinal spherical aberration, astigmatic field curvature, and distortion of the wide angle lens system according to the first embodiment shown in FIG. 1. As the astigmatic field curvature, a tangential field curvature (T) and a sagittal field curvature (S) are shown. FIG. 3 is a diagram showing lateral aberration degrees of the wide angle lens system according to the first embodiment of FIG. 1.

Second Embodiment

Figure 4:
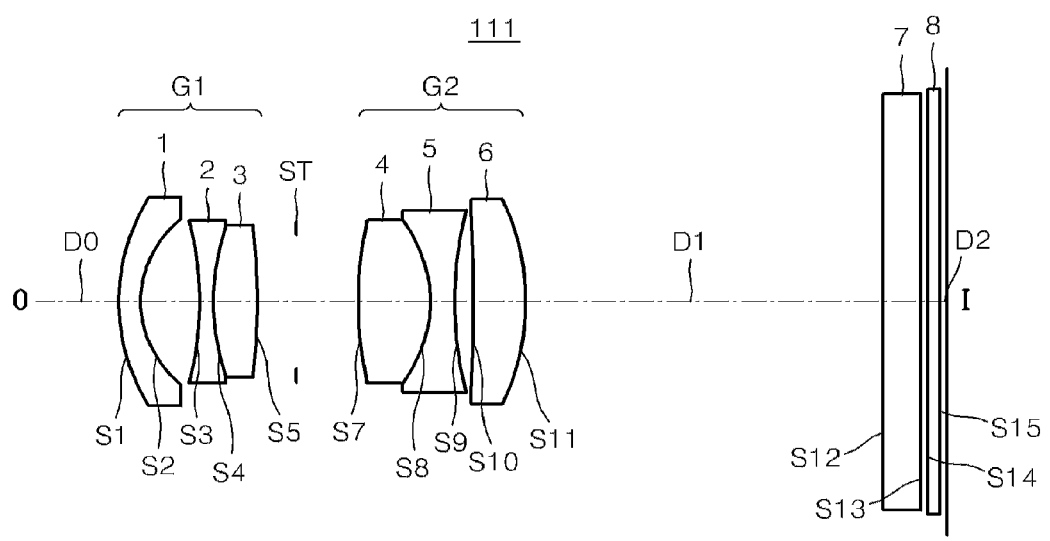
FIG. 4 is a diagram showing a wide angle lens system, according to a second embodiment.

FIG. 4 is a diagram showing a wide angle lens system, according to the second embodiment. The following tables represent design data of the wide angle lens system according to the second embodiment.

EFL=20.2782/Fno=2.8392/FOV=37.3858

TABLE 4

| Lens surface | R | D | Nd | vd |
|---|---|---|---|---|
| OBJECT | INFINITY | D0 | | |
| S1 | 14.05 | 1.3 | 1.7433 | 49.2 |
| S2 | 7.713 | 3.66 | | |
| S3 | −22.45 | 0.8 | 1.51823 | 59 |

TABLE 4-continued

| Lens surface | R | D | Nd | vd |
|---|---|---|---|---|
| S4 | 16.3 | 2.68 | 1.883 | 40.8 |
| S5 | −45.45 | 2.32 | | |
| STOP | INFINITY | 3.8 | | |
| S7 | 25.59 | 4.37 | 1.8042 | 46.5 |
| S8 | −9.71 | 1.45 | 1.69895 | 30.1 |
| S9 | 24.21 | 1.22 | | |
| S10 | −106 | 3.15 | 1.68997 | 53 |
| S11 | −15.44 | D1 | | |
| S12 | INFINITY | 2.24 | 1.5168 | 64.2 |
| S13 | INFINITY | 0.5 | | |
| S14 | INFINITY | 0.7 | 1.5168 | 64.2 |
| S15 | INFINITY | D2 | | |
| IMAGE | INFINITY | | | |

Table 5 represents the deformation terms of the wide angle lens system according to the second embodiment.

TABLE 5

| Lens surface | K | A | B | C | D |
|---|---|---|---|---|---|
| S11 | −1 | 2.251652E−05 | −2.506500E−08 | 6.688928E−09 | 0.00E+00 |

Table 6 represents variable distances during focusing in the wide angle lens system according to the second embodiment.

TABLE 6

| D0 | INFINITY | 1219.62 | 115.583 |
|---|---|---|---|
| D1 | 21.662 | 22 | 25.312 |
| D2 | 0.47 | 0.47 | 0.47 |

Figure 5:
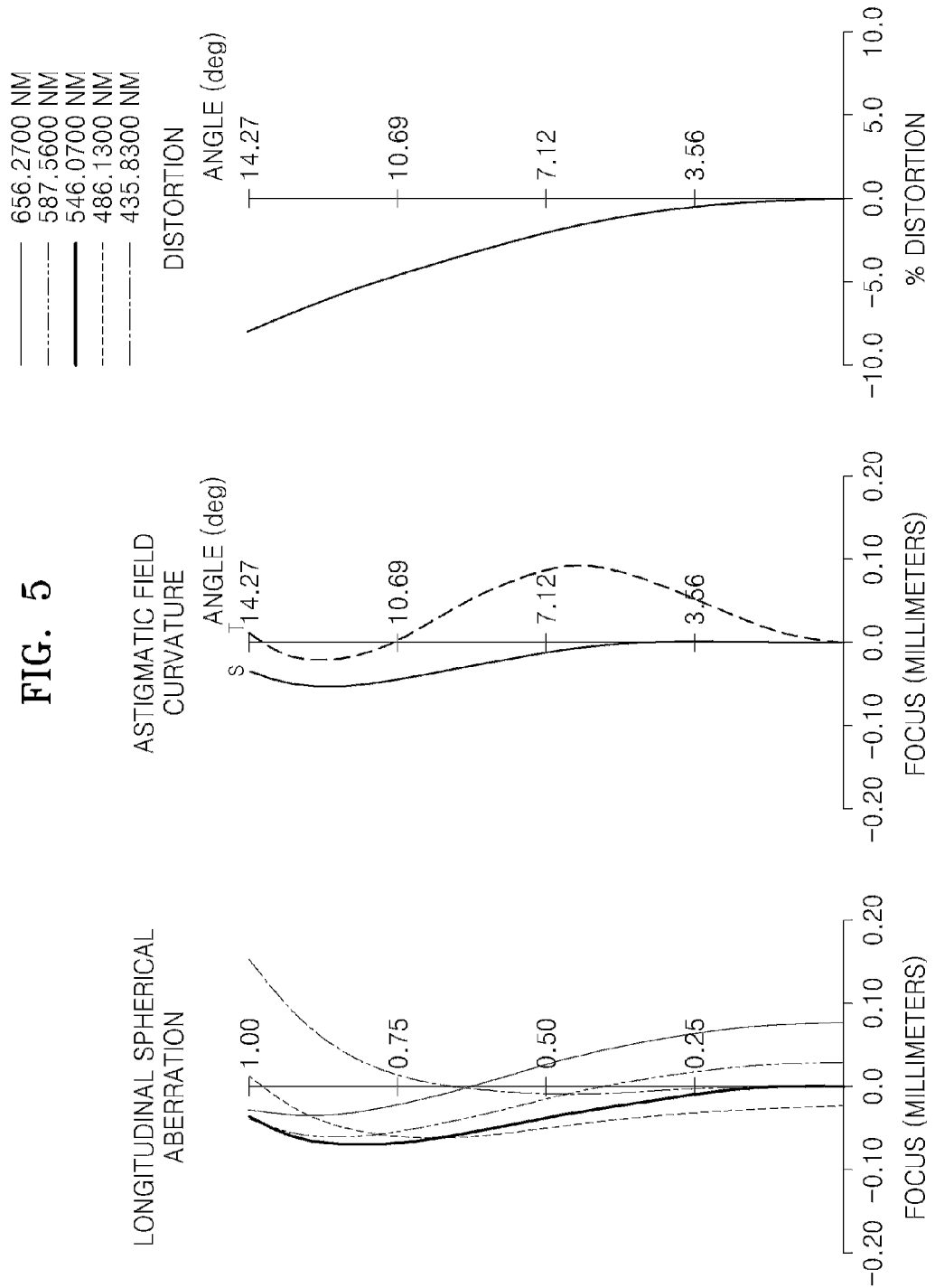
FIG. 5 is a diagram showing longitudinal spherical aberration, astigmatic field curvature, and distortion of the wide angle lens system shown in FIG. 4.

FIG. 5 is a diagram showing longitudinal spherical aberration, astigmatic field curvature, and distortion of the wide angle lens system according to the second embodiment shown in FIG. 4.

Third Embodiment

Figure 6:
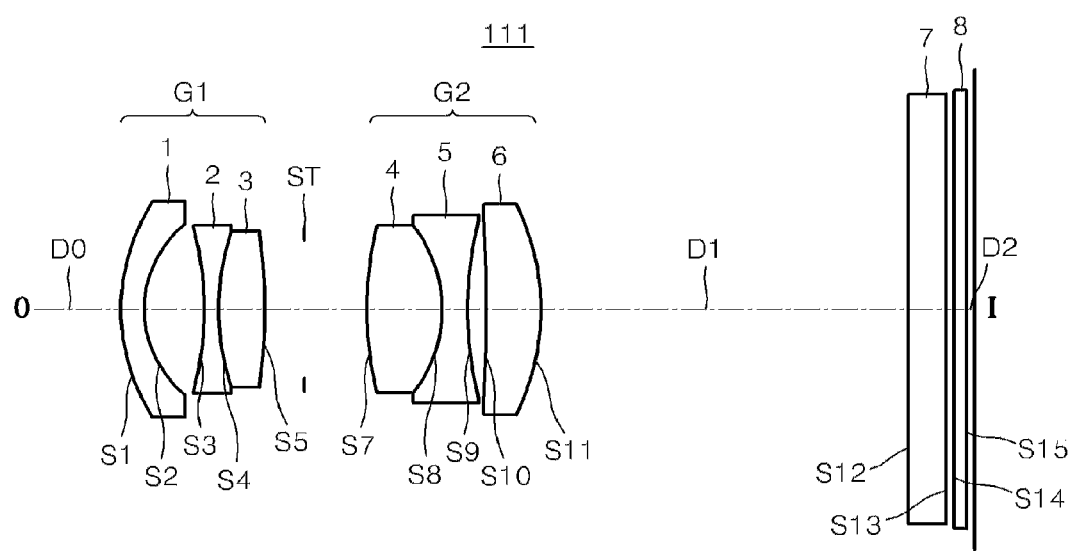
FIG. 6 is a diagram showing a wide angle lens system, according to a third embodiment.

FIG. 6 is a diagram showing a wide angle lens system, according to the third embodiment. The following tables represent design data of the wide angle lens system according to the third embodiment.
EFL=20.5171/Fno=2.884/FOV=36.9366

TABLE 7

| Lens surface | R | D | Nd | vd |
|---|---|---|---|---|
| OBJECT | INFINITY | D0 | | |
| S1 | 14.274 | 1.3 | 1.7433 | 49.2 |
| S2 | 7.712 | 3.8 | | |
| S3 | −22.07 | 0.8 | 1.51823 | 59 |
| S4 | 16.018 | 2.7 | 1.883 | 40.8 |
| S5 | −43.23 | 2.37 | | |
| STOP | INFINITY | D1 | | |
| S7 | 24.17 | 3.81 | 1.8042 | 46.5 |
| S8 | −9.75 | 1.44 | 1.69895 | 30.1 |
| S9 | 23.372 | 1.38 | | |
| S10 | −96.9 | 3.15 | 1.68997 | 53 |
| S11 | −15.827 | D2 | | |
| S12 | INFINITY | 2.24 | 1.5168 | 64.2 |
| S13 | INFINITY | 0.5 | | |
| S14 | INFINITY | 0.7 | 1.5168 | 64.2 |
| S15 | INFINITY | D3 | | |
| IMAGE | INFINITY | | | |

Table 8 represents the deformation terms of the wide angle lens system according to the third embodiment.

TABLE 8

| Lens surface | K | A | B | C | D |
|---|---|---|---|---|---|
| S11 | −1 | 2.50275E−05 | 1.35011E−07 | 5.76467E−08 | 0.00E+00 |

Table 9 represents variable distances during focusing in the wide angle lens system according to the third embodiment.

TABLE 9

| D0 | INFINITY | 1233.779 | 116.734 |
|---|---|---|---|
| D1 | 22.682 | 23.024 | 26.375 |
| D2 | 0.47 | 0.47 | 0.47 |

Figure 7:
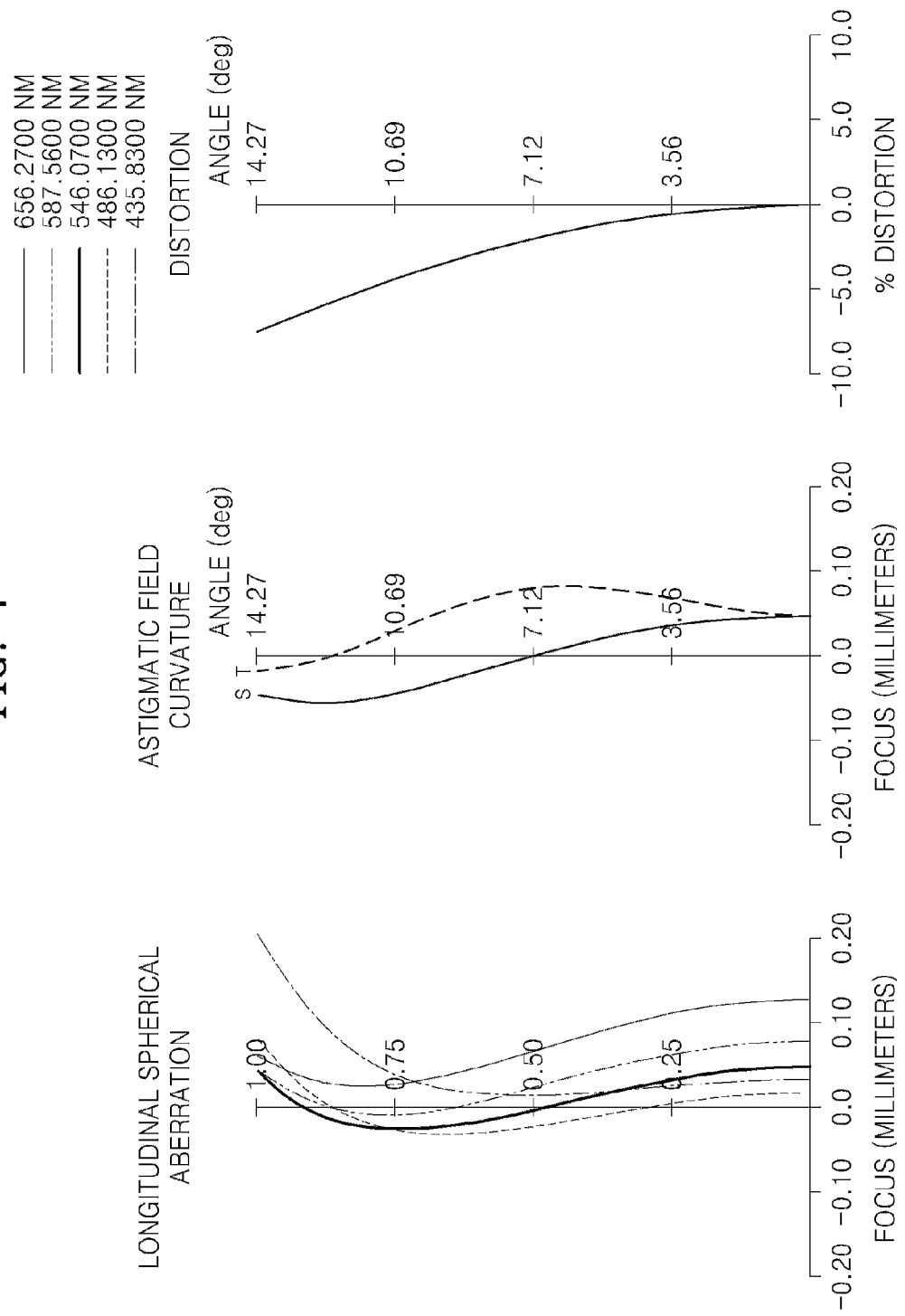
FIG. 7 is a diagram showing longitudinal spherical aberration, astigmatic field curvature, and distortion of the wide angle lens system shown in FIG. 6.

FIG. 7 is a diagram showing longitudinal spherical aberration, astigmatic field curvature, and distortion of the wide angle lens system according to the third embodiment shown in FIG. 6.

Fourth Embodiment

Figure 8:
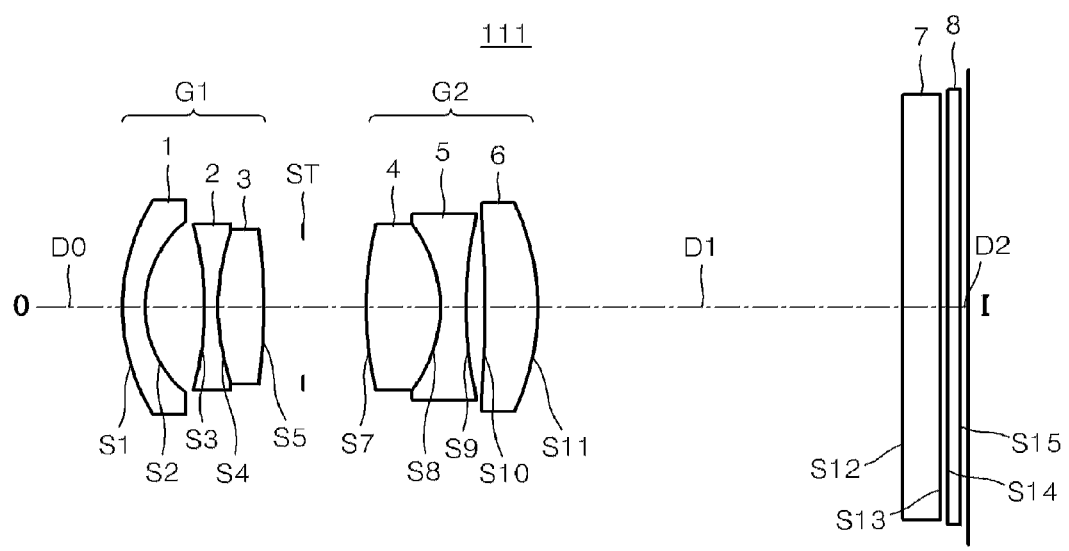
FIG. 8 is a diagram showing a wide angle lens system, according to a fourth embodiment.

FIG. 8 is a diagram showing a wide angle lens system, according to the fourth embodiment. The following tables represent design data of the wide angle lens system according to the fourth embodiment.
EFL=20.2790/Fno=2.8689/FOV=37.38

TABLE 10

| Lens surface | R | D | Nd | vd |
|---|---|---|---|---|
| OBJECT | INFINITY | D0 | | |
| S1 | 14.274 | 1.3 | 1.7433 | 49.2 |
| S2 | 7.712 | 3.8 | | |
| S3 | −22.07 | 0.8 | 1.51823 | 59 |
| S4 | 16.018 | 2.7 | 1.883 | 40.8 |
| S5 | −43.23 | 2.37 | | |
| STOP | INFINITY | 3.97 | | |
| S7 | 24.17 | 3.81 | 1.8042 | 46.5 |
| S8 | −9.75 | 1.44 | 1.69895 | 30.1 |
| S9 | 23.372 | 1.38 | | |
| S10 | −96.9 | 3.15 | 1.68997 | 53 |
| S11 | −15.827 | D1 | | |
| S12 | INFINITY | 2.24 | 1.5168 | 64.2 |
| S13 | INFINITY | 0.5 | | |
| S14 | INFINITY | 0.7 | 1.5168 | 64.2 |
| S15 | INFINITY | D2 | | |
| IMAGE | INFINITY | | | |

Table 11 represents the deformation terms of the wide angle lens system according to the fourth embodiment.

TABLE 11

| Lens surface | K | A | B | C | D |
|---|---|---|---|---|---|
| S11 | −1 | 2.50275E−05 | 1.35011E−07 | 5.76467E−08 | 0.00E+00 |

Table 12 represents variable distances during focusing in the wide angle lens system according to the fourth embodiment.

TABLE 12

| D0 | INFINITY | 1219.606 | 115.528 |
|---|---|---|---|
| D1 | 21.755 | 22.093 | 25.405 |
| D2 | 0.475 | 0.475 | 0.475 |

Figure 9:
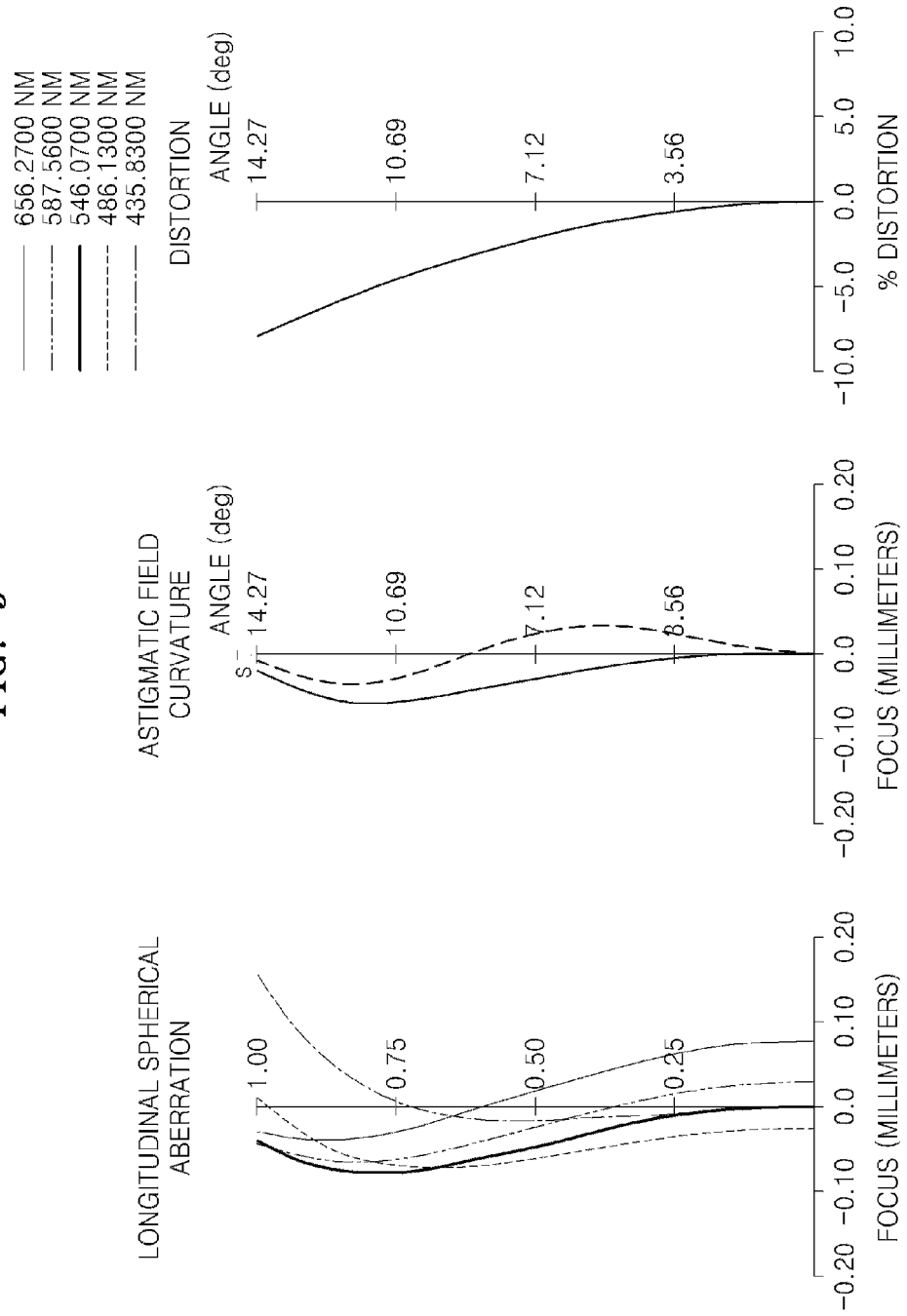
FIG. 9 is a diagram showing longitudinal spherical aberration, astigmatic field curvature, and distortion of the wide angle lens system shown in FIG. 8.

FIG. 9 is a diagram showing longitudinal spherical aberration, astigmatic field curvature, and distortion of the wide angle lens system according to the fourth embodiment shown in FIG. 8.

Fifth Embodiment

Figure 10:
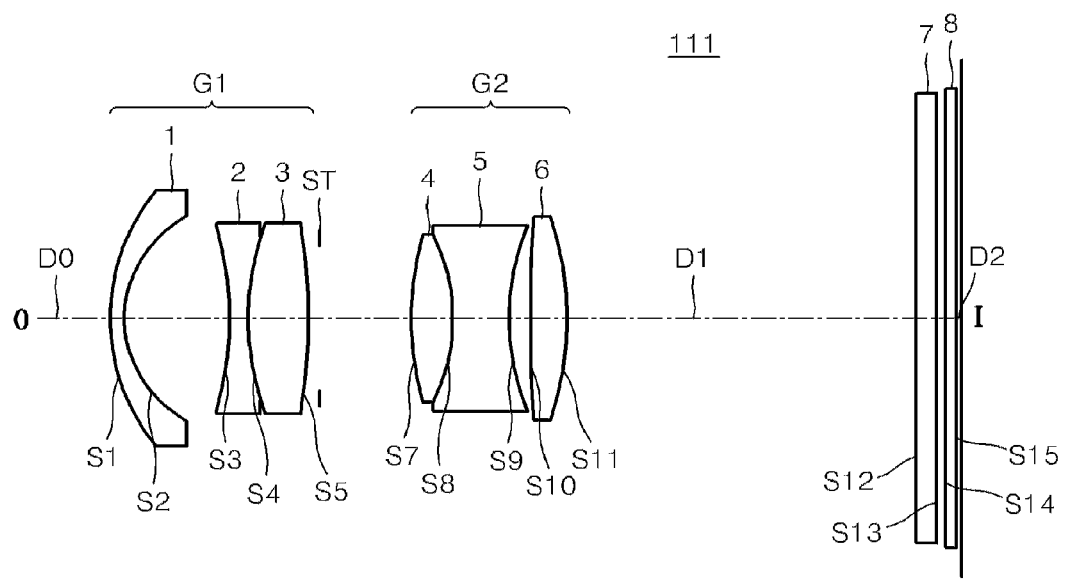
FIG. 10 is a diagram showing a wide angle lens system, according to a fifth embodiment.

FIG. 10 is a diagram showing a wide angle lens system, according to the fifth embodiment. The following tables represent design data of the wide angle lens system according to the fifth embodiment.
EFL=17.8498, Fno=2.7362, FOV=41.8270

TABLE 13

| Lens surface | R | D | Nd | vd |
|---|---|---|---|---|
| OBJECT | INFINITY | D0 | | |
| S1 | 13.352 | 0.8 | 1.7081 | 55.8 |
| S2 | 7.592 | 5.98 | | |
| S3 | −20.956 | 0.97 | 1.53535 | 56.2 |
| S4 | 19.796 | 3.47 | 1.86125 | 42.1 |
| S5 | −35.424 | 0.64 | | |
| STOP | INFINITY | 5.11 | | |
| S7 | 21.128 | 2.36 | 1.87895 | 41 |
| S8 | −11.986 | 3.2 | 1.71681 | 27.8 |
| S9 | 18.022 | 1.13 | | |
| S10 | 108.622 | 2.08 | 1.52391 | 75.6 |
| S11 | −16.881 | D1 | | |
| S12 | INFINITY | 1.12 | 1.5168 | 64.2 |
| S13 | INFINITY | 0.5 | | |
| S14 | INFINITY | 0.7 | 1.5168 | 64.2 |
| S15 | INFINITY | D2 | | |
| IMAGE | INFINITY | | | |

Table 14 represents the deformation terms of the wide angle lens system according to the fifth embodiment.

TABLE 14

| | K | A | B | C | D |
|---|---|---|---|---|---|
| S11 | −1 | 8.70701E−05 | 2.38845E−07 | 1.50456E−07 | 0.00000E+00 |

Table 15 variable distances during focusing in the wide angle lens system according to the fifth embodiment.

TABLE 15

| D0 | INFINITY | 1072.18 | 100.356 |
|---|---|---|---|
| D1 | 19.709 | 20.031 | 23.05 |
| D2 | 0.292 | 0.268 | 0.164 |

Figure 11:
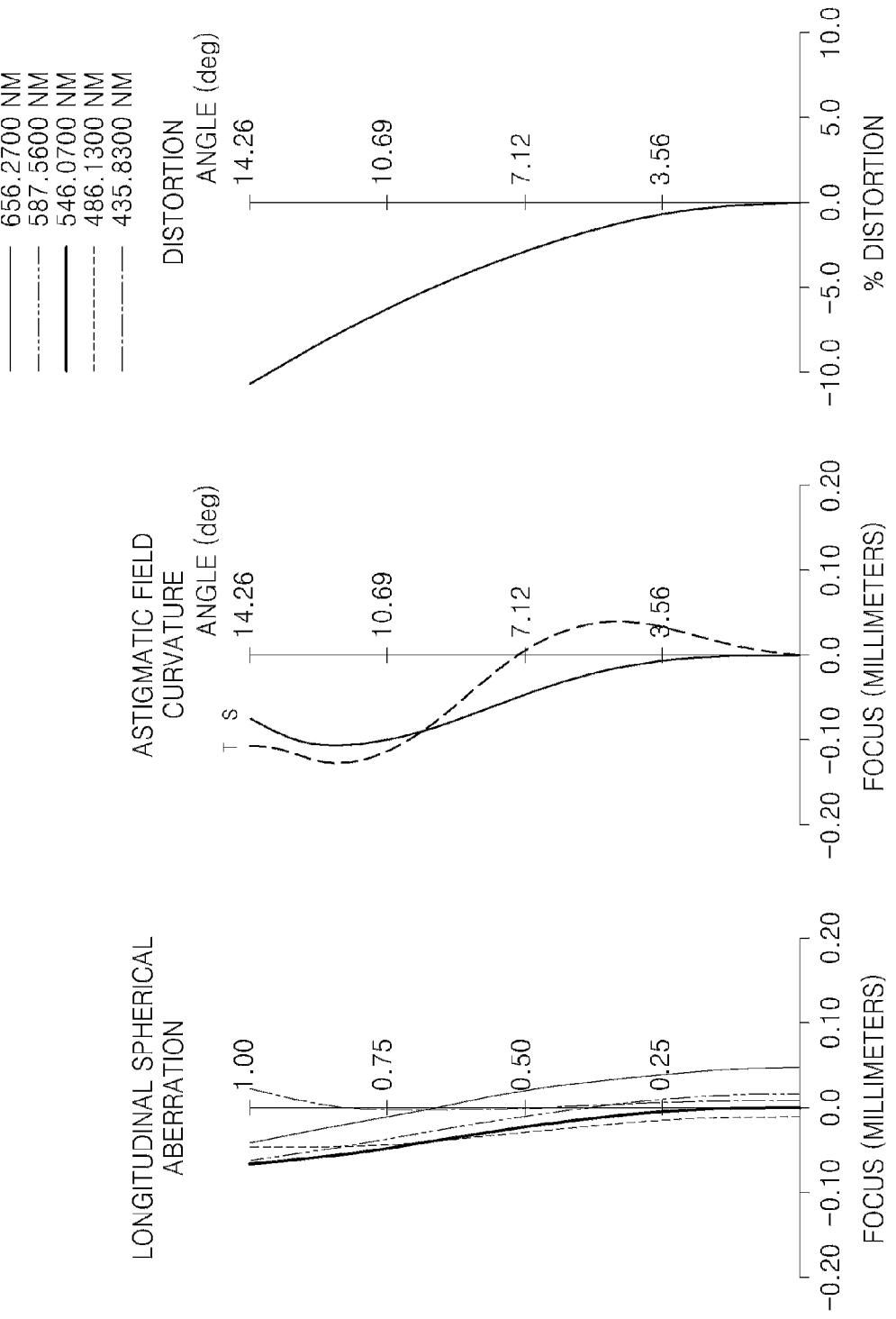
FIG. 11 is a diagram showing longitudinal spherical aberration, astigmatic field curvature, and distortion of the wide angle lens system shown in FIG. 10.

FIG. 11 is a diagram showing longitudinal spherical aberration, astigmatic field curvature, and distortion of the wide angle lens system according to the fifth embodiment shown in FIG. 10.

The following table shows that the wide angle lens systems according to the first through fifth embodiments satisfy the above expressions 1 through 8.

TABLE 16

| Items | First embodiment | Second embodiment | Third embodiment | Fourth embodiment | Fifth embodiment |
|---|---|---|---|---|---|
| $f_{all}/D_{all}$ | 0.81 | 0.82 | 0.88 | 0.82 | 0.69 |
| $d_1/f_1$ | −0.07 | −0.06 | −0.04 | −0.06 | −0.09 |
| $d_2/f_2$ | 0.08 | 0.06 | 0.06 | 0.07 | 0.06 |
| $d_{12}/f_{all}$ | 0.32 | 0.30 | 0.32 | 0.31 | 0.32 |
| $(R_{1B} - R_{2A})/(R_{1B} + R_{2A})$ | −2.07 | −2.05 | −1.68 | −2.07 | −2.14 |
| $(R_{3B} - R_{4A})/(R_{3B} + R_{4A})$ | 2.93 | 3.58 | −5 | 3.54 | 3.96 |
| $(R_{5B} - R_{6A})/R_{5B} + R_{6A})$ | 0.73 | 0.75 | 0.73 | 0.72 | 1.37 |
| $f_1/f_{all}$ | −2.83 | −3.02 | −4.32 | −3.12 | −3.59 |
| $f_2/f_{all}$ | 1.02 | 1.03 | 1.06 | 1.04 | 1.14 |
| $D_{all}/HT$ | 3.20 | 3.22 | 3.22 | 3.22 | 3.02 |

Figure 12:
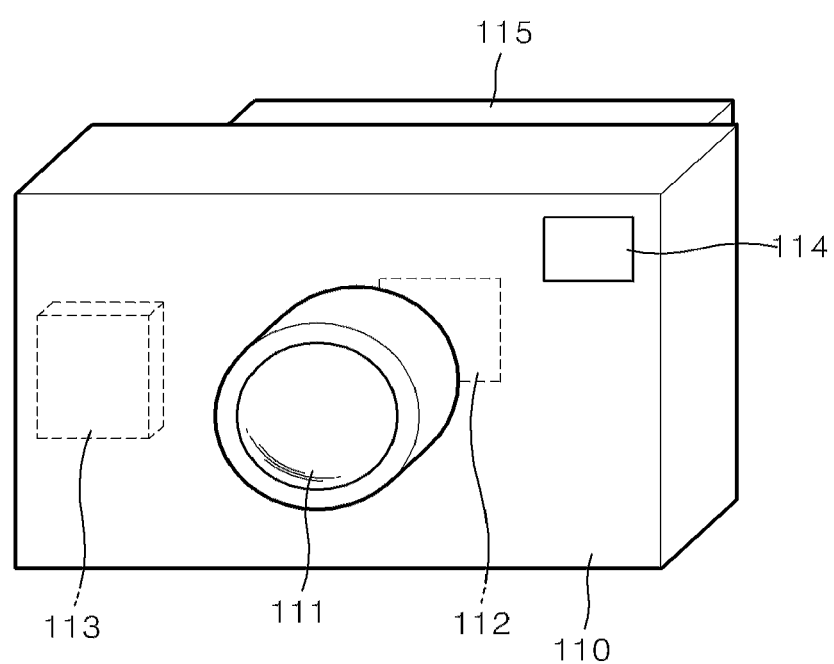
FIG. 12 is a diagram of a photographing apparatus, according to an embodiment.

FIG. 12 is a diagram of a photographing apparatus 110, according to an embodiment. A wide angle lens system according to an embodiment may be used in photographing apparatuses such as electronic still cameras, video cameras, and single lens reflex cameras. FIG. 12 schematically shows the photographing apparatus 110 having a wide angle lens system 111 according to an embodiment. The photographing apparatus 110 includes the wide angle lens system 111 and an imaging device 112 that receives light focused by the wide angle lens system 111. The photographing apparatus 110 may further include a recording unit 113 for recording information on a subject that is photoelectrically converted by the imaging device 112, and a finder 114 for observing images of the subject. In addition, the photographing apparatus 110 may include a liquid crystal display panel 115 on which an image of the subject is displayed. The photographing apparatus 110 shown in FIG. 12 is an example, and should not be construed as limiting. That is, a wide angle lens system 111 according to the embodiments may be applied to various optical devices besides a camera. As described above, when the wide angle lens system 111 according to the embodiments is applied to photographing apparatuses such as digital cameras, the optical device having a small size that may photograph the subject with a wide angle may be realized. For example, a retro-focus type lens that is suitable for a wide angle lens used in a single lens reflex camera or a digital camera using 35 mm film or an imaging sensor may be provided. A wide angle lens system 111 according to an embodiment is suitable for a large aperture lens with a small size having a wide viewing angle of about 70° or greater and an aperture ratio of about 1:2.8, and may perform a focusing operation with a simple structure. In addition, a wide angle lens system 111 according to an embodiment has an appropriate back focal length, and thus, may be used as a retro-focus type lens.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A wide angle lens system comprising:
a first lens group having a negative refractive power and a second lens group having a positive refractive power arranged from an object side,
wherein the first lens group comprises a first lens of a meniscus shape having a convex surface toward the object side, a second lens having a concave surface toward the object side, and a third lens having a convex surface toward the object side, and the second lens group comprises a fourth lens having a convex surface toward the object side, a fifth lens having a concave surface toward the object side, and a sixth lens of a meniscus shape having a concave surface toward the object side, and
the wide angle lens system satisfies the following expression, $0.60 \leq f_{all}/D_{all} \leq 1.00$, where $f_{all}$ denotes an effective focal length of the wide angle lens system, and $D_{all}$ denotes a distance from a vertex of the surface of the first lens facing the object side to a vertex of a surface of the sixth lens facing an image side.

2. The wide angle lens system of claim 1, further satisfying the following expressions, $-0.10 \leq d1/f1 \leq -0.03$ $0.03 \leq d2/f2 \leq 0.10$, where d1 denotes a distance between the first lens and the second lens, f1 denotes an effective focal length of the first lens group, d2 denotes a distance between the fifth lens and the sixth lens, and f2 denotes an effective focal length of the second lens group.

3. The wide angle lens system of claim 1, further satisfying the following expression, $0.25 \leq d12/f_{all} \leq 0.35$, where d12 denotes a distance between the first lens group and the second lens group, and $f_{all}$ denotes an effective focal length of the wide angle lens system.

4. The wide angle lens system of claim 1, further satisfying the following expressions, $-2.0 \leq (R_{1B}-R_{2A})/(R_{1B}+R_{2A}) \leq -1.5$ $-5.0 \leq (R_{3B}-R_{4A})/(R_{3B}+R_{4A}) \leq 4.0$ $0.5 \leq (R_{5B}-R_{6A})/(R_{5B}+R_{6A}) \leq 0.8$, where $R_{1B}$ denotes a radius of curvature of an image side surface of the first lens, $R_{2A}$ denotes a radius of curvature of the object side surface of the second lens, $R_{3B}$ denotes a radius of curvature of an image side surface of the third lens, $R_{4A}$ denotes a radius of curvature of the object side surface of the fourth lens, $R_{5B}$ denotes a radius of curvature of an image side surface in the fifth lens, and $R_{6A}$ denotes a radius of curvature of the object side surface of the sixth lens.

5. The wide angle lens system of claim 1, further satisfying the following expressions, $-4.5 \leq f1/f_{all} \leq -2.7$ $0.8 \leq f2/f_{all} \leq 1.1$, where f1 denotes an effective focal length of the first lens group, f2 denotes an effective focal length of the second lens group, and $f_{all}$ denotes an effective focal length of the wide angle lens system.

6. The wide angle lens system of claim 1, further satisfying the following expression, $3.0 \leq D_{all}/HT \leq 3.3$, where $D_{all}$ denotes the distance from the vertex of the object side surface of the first lens to the vertex of the image side surface of the sixth lens, and HT denotes an image plane height of a paraxial marginal ray.

7. The wide angle lens system of claim 1, wherein the sixth lens has at least one aspherical surface.

8. The wide angle lens system of claim 1, wherein the first lens or the sixth lens has the largest effective aperture among the lenses in the wide angle lens system.

9. The wide angle lens system of claim 1, wherein the second lens and the third lens are cemented.

10. The wide angle lens system of claim 1, wherein the fourth lens and the fifth lens are cemented.

11. The wide angle lens system of claim 1, further comprising a stop between the first lens group and the second lens group.

12. The wide angle lens system of claim 1, wherein the second lens is a biconcave lens, and the fifth lens is a biconcave lens.

13. The wide angle lens system of claim 1, wherein the third lens is a biconvex lens, and the fourth lens is a biconvex lens.

14. The wide angle lens system of claim 1, wherein the first lens has a negative refractive power.

15. The wide angle lens system of claim 1, wherein the sixth lens has a positive refractive power.

16. The wide angle lens system of claim 1, wherein the first lens group and the second lens group move together to perform a focusing operation.

17. A photographing apparatus comprising:
a wide angle lens system; and
an imaging sensor that receives light focused by the wide angle lens system,
wherein the wide angle lens system comprises a first lens group having a negative refractive power and a second lens group having a positive refractive power arranged from an object side,
the first lens group comprises a first lens of a meniscus shape having a convex surface toward the object side, a second lens having a concave surface toward the object side, and a third lens having a convex surface toward the object side, and the second lens group comprises a fourth lens having a convex surface toward the object side, a fifth lens having a concave surface toward the object side, and a sixth lens of a meniscus shape having a concave surface toward the object side, and
the wide angle lens system satisfies the following expression, $$0.60 \leq f_{all}/D_{all} \leq 1.00,$$

where $f_{all}$ denotes an effective focal length of the wide angle lens system, and $D_{all}$ denotes a distance from a vertex of the surface of the first lens facing the object side to a vertex of a surface of the sixth lens facing an image side.

18. The photographing apparatus of claim 17, wherein the wide angle lens system satisfies the following expressions, $$-0.10 \leq d1/f1 \leq -0.03$$

$$0.03 \leq d2/f2 \leq 0.10,$$

where d1 denotes a distance between the first lens and the second lens, f1 denotes an effective focal length of the first lens group, d2 denotes a distance between the fifth lens and the sixth lens, and f2 denotes an effective focal length of the second lens group.

19. The photographing apparatus of claim 17, wherein the wide angle lens system satisfies the following expression, $$0.25 \leq d12/f_{all} \leq 0.35,$$

where d12 denotes a distance between the first lens group and the second lens group, and $f_{all}$ denotes an effective focal length of the wide angle lens system.

* * * * *